United States Patent [19]

Kock et al.

[11] Patent Number: 4,786,706

[45] Date of Patent: Nov. 22, 1988

[54] LIQUID-CRYSTALLINE POLYCONDENSATES WHICH CONTAIN UREA DERIVED LINKING GROUPS

[75] Inventors: Hans-Jakob Kock, Ludwigshafen; Bernd Hisgen, Limburgerhof; Michael Portugall, Wachenheim, all of Fed. Rep. of Germany

[73] Assignee: BASF Aktiengesellschaft, Fed. Rep. of Germany

[21] Appl. No.: 938,069

[22] Filed: Dec. 4, 1986

[30] Foreign Application Priority Data

Dec. 4, 1985 [DE] Fed. Rep. of Germany ....... 3542831

[51] Int. Cl.$^4$ .................. C08G 63/54; C08G 69/44
[52] U.S. Cl. .................. 528/125; 528/128; 528/170; 528/171; 528/172; 528/173; 528/183; 528/184; 528/193
[58] Field of Search ............ 528/183, 184, 193, 170, 528/125, 172, 128, 171, 173

[56] References Cited

U.S. PATENT DOCUMENTS

| | | | |
|---|---|---|---|
| 4,118,372 | 10/1978 | Schaefgen | 528/190 |
| 4,219,461 | 8/1980 | Calundann | 528/173 |
| 4,351,917 | 9/1982 | Calundann et al. | 524/602 |
| 4,375,530 | 3/1983 | Hay et al. | 524/605 |
| 4,473,681 | 9/1984 | East | 524/601 |
| 4,564,669 | 1/1986 | Dicke et al. | 528/173 |
| 4,722,993 | 2/1988 | Hisgen et al. | 528/183 |
| 4,727,129 | 2/1988 | Hisgen et al. | 528/171 |
| 4,727,131 | 2/1988 | Kock et al. | 528/171 |
| 4,728,713 | 3/1988 | Hisgen et al. | 528/183 |
| 4,728,714 | 3/1988 | Hisgen et al. | 528/183 |
| 4,728,715 | 3/1988 | Kock et al. | 528/171 |

Primary Examiner—John Kight
Assistant Examiner—Frederick Krass
Attorney, Agent, or Firm—Keil & Weinkauf

[57] ABSTRACT

Liquid-crystalline carbamyl-containing polycondensates composed of (a) aromatic hydroxycarboxylic and/or aminocarboxylic acids in which the hydroxyl and amino groups are not vicinal to the carboxyl group,
(b) from 0.1 to 20 mol % of urea,
(c) aromatic dihydroxy, diamino and/or hydroxyamino compounds in which the hydroxyl and amino groups are not vicinal,
(d) a molar amount equivalent to the total amount of components b and c of an aromatic dicarboxylic acid in which the carboxyl groups are not vicinal, the preparation thereof and fibers, films and moldings prepared therefrom.

7 Claims, No Drawings

LIQUID-CRYSTALLINE POLYCONDENSATES WHICH CONTAIN UREA DERIVED LINKING GROUPS

U.S. Pat. No. 4,219,461 describes liquid-crystalline polyesters which are based on 4-hydroxybenzoic acid, 2,6-hydroxynaphthalenecarboxylic acid, hydroquinone and terephthalic acid. However, these polyesters are in need of improvement in heat distortion resistance. German laid-open application DOS No. 3,325,705 discloses liquid-crystalline polyesters which are based on 4-hydroxybenzoic acid, terephthalic acid and/or isophthalic acid, 2,7-dihydroxynaphthalene with or without hydroquinone. The polyesters described therein, however, have glass transition temperatures of only 130° C. U.S. Pat. No. 4,330,457 describes polyester amides based on hydroxynaphthalene-carboxylic acid, terephthalic acid, hydroquinone and p-aminophenol. However, these polyester amines have a glass transition temperature of about 105° C. The same is true of the polyester amides disclosed in U.S. Pat. No. 4,351,917, which are based on p-aminophenol, p-hydroxybenzoic acid and hydroxynaphthalenecarboxylic acid. U.S. Pat. No. 4,473,681 describes polyester carbamides which are based on hydroxynaphthalenecarboxylic acid, a dihydroxyaryl compound and N,N'-bis(carboxyphenyl)urea. The polyester carbamides obtained, having a glass transition temperature of 120° C., are not sufficiently heat distortion resistant.

It is an object of the present invention to provide liquid-crystalline mesomorphic polycondensates which are easy to process and have a high heat distortion resistance and also a high abrasion resistance.

We have found that this object is achieved with liquid-crystalline carbamyl-containing polycondensates composed of (a) aromatic hydroxycarboxylic and/or aminocarboxylic acids in which the hydroxyl and amino groups are not vicinal to the carboxyl group, (b) from 0.1 to 20 mol % of urea, (c) aromatic dihydroxy, diamino and/or hydroxyamino compounds in which the hydroxyl and amino groups are not vicinal, (d) an amount equivalent to the total amount of components b and c of an aromatic dicarboxylic acid in which the carboxyl groups are not vicinal.

The novel polycondensates have the advantage that they are easy to process. They also have the advantage of a higher heat distortion resistance than comparable condensates. Moreover, the novel condensates have good mechanical properties, in particular a smooth abrasion-resistant surface. They also exhibit a lower decrease in the shear modulus with increasing temperature.

Preferred polycondensates are composed of (a) at least one hydroxy- or amino-benzene or naphthalene carboxylic acid. The amino and hydroxyl groups are arranged in the benzenecarboxylic acids in the 4- or 3-position, while in the case of the naphthalenecarboxylic acids the carboxyl group is in the 2-position and the amino and hydroxyl groups are in the 6- or 7-position. The proportion of component a is advantageously >10 mol %, in particular >20 mol %, (b) from 0.1 to 20 mol %, advantageously from 0.5 to 15 mol %, of urea, (c) aromatic diamino, dihydroxy and/or aminohydroxy compounds which are derived from mononuclear or polynuclear benzene rings, such as phenylene radicals, which may be bonded to one another directly or via an oxygen atom and a sulfur atom, an SO$_2$ group, a CH$_2$ group or a CO group, and also polynuclear radicals such as naphthylene and anthraquinoylene. In general, the reactive hydroxyl and/or amino groups are in each case positioned at opposite ends of a molecular. Component b is advantageously present in an amount of from 10 to 44 mol %. The aromatic radicals may also contain C$_1$–C$_4$-alkyl or phenyl and also halogen as lateral substituents.

(d) An amount equivalent to the total amount of b and c of terephthalic acid, isophthalic acid, bis(p- or m-carboxyphenyl)carbonate or mixtures thereof.

It will be readily understood that the mol percentages of components a, b, c and d add up to 100 mol % in each case.

Particularly preferred polycondensates are composed of (a) not less than 10 mol % of one or more of the repeat units of the formula I and/or II

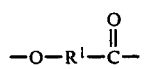

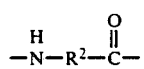

where R$^1$ and R$^2$ can be identical or different and each is 1,4-phenylene or 1,3-phenylene, (b) from 0.1 to 20 mol % of repeat units of the formula III

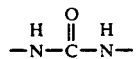

(c) from 15 to 35 mol % of one or more of the repeat units of the formula IV $$-X-R^{13}Y- \qquad \text{IV}$$

where R$^3$ is 1,4-phenylene, 1,3-phenylene, 2,6-naphthene, 2,7-naphthylene, 4,4'-biphenylene, 3,4'-biphenylene, or 2,6-anthraquinoylene, which may all be substituted by halogen, alkyl of 1 to 4 carbon atoms or phenyl, or R$^3$ is

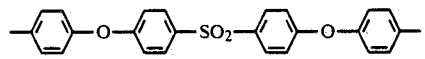

and X and Y can be identical or different and each is oxygen or —NH—, preferably in an amount of from 15 to 35 mol %, (d) an amount equivalent to the total amount of components b and c of repeat units of the formula V

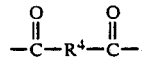

where R$^4$ is 1,4-phenylene, 1,3-phenylene or a radical of the formula VI and/or VII

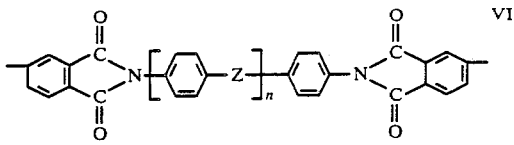

VI

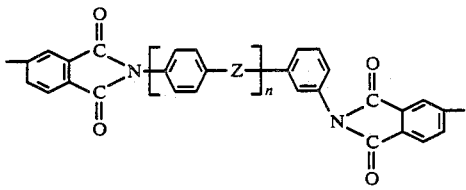

VII where each Z is —O—, —S—, SO$_2$—, —CO—, —CH$_2$— or =C(CH$_3$)$_2$, and n is 0 or 1, or R$^4$ is a radical of the formula VIII, IX or X

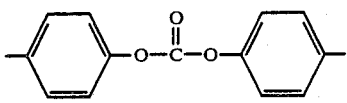

VIII

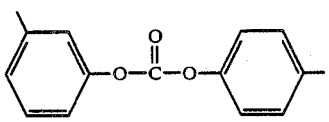

IX

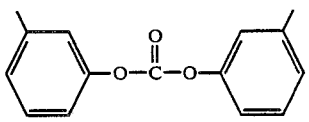

X the mol percentages of components a, b, c and d adding up to 100 mol % in each case.

Suitable starting materials for component a are for example 4-hydroxybenzoic acid, 3-hydroxybenzoic acid, 4-aminobenzoic acid, 3-aminobenzoic acid or 6-hydroxynaphthalene-2-carboxylic acid.

The starting compound used for component b is urea.

Suitable components c are for example hydroquinone, resorcinol, 2,6-dihydroxynaphthalene, 2,7-dihydroxynaphthalene, 4,4'-biphenyl, 2,6-dihydroxyanthraquinone, 4,4'-di(p-hydroxyphenoxy)diphenyl sulfone, p-phenylenediamine, m-phenylenediamine, p-aminophenol, m-aminophenol or 2,6-diaminoanthraquinone.

Suitable components d are for example terephthalic acid, isophthalic acid, 4,4'-bis[(4-carboxy)-N-phthalimido]diphenyl ether, 4,4'-bis[(4-carboxy)-N-phthalimido]diphenylmethane, 4,4'-bis[(4-carboxy)-N-phthalimido]diphenyl sulfone, 4,4'-bis[(4-carboxy)-N-phthalamido]diphenyl sulfide, 4,4'-bis[(4-carboxy)-N-phthalimido]diphenyl ketone, 3,4'-bis[(4-carboxy)-N-phthalimido]diphenyl ether, -diphenyl sulfide, -diphenyl sulfone, -diphenyl ketone, -diphenylmethane, or -diphenylpropane or bis(p- or m-carboxyphenyl), carbonate, advantageously in an amount of up to 40 mol % of the amount of dicarboxylic acid employed.

Suitable polycondensates are for example

1. Wholly aromatic mesomorphic polyether ester carbamides composed of
(a) not less than 10 mol % of 4-hydroxybenzoic acid
(b) from 0.5 to 12 mol % of urea
(c$_1$) from 3 to 20 mol % of hydroquinone and/or 4,4'-dihydroxybiphenyl
(c$_2$) from 5 to 30 mol % of 4,4'-di(p-hydroxyphenoxy)-diphenyl sulfone
(d) a molar amount equivalent to the total amount of components b and c of terephthalic acid.

2. Polyester carbamides composed of
(a) not less than 10 mol % of 4-hydroxybenzoic acid
(b) from 0.1 to 11 mol % of urea
(c$_1$) from 10 to 25 mol % of 3,3', 5,5'-tetramethyl-4,4'-dihydroxydiphenyl
(c$_2$) from 5 to 15 mol % of hydroquinone
(c$_3$) from 5 to 15 mol % of 4,4'-dihydroxybiphenyl
(d) a molar amount equivalent to the total amount of components b and c of terephthalic acid.

3. Polyester carbamides composed of
(a) not less than 10 mol % of 4-hydroxybenzoic acid
(b) from 0.1 to 7 mol % of urea
(c$_1$) from 5 to 35 mol % of tert.-butylhydroquinone
(c$_2$) from 2 to 30 mol % of 4,4'-dihydroxybiphenyl
(d) a molar amount corresponding to the total amount of b and c of terephthalic acid.

4. Polyester amide carbamides composed of
(a) not less than 10 mol % of 4-hydroxybenzoic acid, of which some may be replaced by 4-aminobenzoic acid
(b) from 0.4 to 10 mol % of urea
(c$_1$) from 3 to 30 mol % of tert.-butylhydroquinone
(c$_2$) from 3 to 30 mol % of 3-aminophenol
(c$_3$) from 2 to 25 mol % of one or more of the compounds hydroquinone, 4,4'-dihydroxybiphenyl and resorcinol
(d) a molar amount corresponding to the total amount of components b and c of terephthalic acid, some of which may be replaced by isophthalic acid.

5. Polyester amide carbamides composed of
(a) not less than 10 mol % of 4-hydroxybenzoic acid optionally from 5 to 25 mol % of 3-hydroxybenzoic acid
(b) from 0.1 to 7 mol % of urea
(c$_1$) from 3 to 30 mol % of 3-aminophenol
(c$_2$) from 3 to 25 mol % of one or more of the compounds hydroquinone, 4,4'-dihydroxybiphenyl and resorcinol
(d) a molar amount corresponding to the total amount of components b and c of terephthalic acid and/or isophthalic acid.

6. Polyether ester carbamides composed of
(a) not less than 10 mol % of 4-hydroxybenzoic acid
(b) from 0.1 to 7 mol % of urea
(c$_1$) from 5 to 20 mol % of 4,4'-di(p-hydroxyphenoxy)-diphenyl sulfone
(c$_2$) from 10 to 30 mol % of tert.-butylhydroquinone
(d) a molar amount equivalent to the total amount of components b and c of terephthalic acid.

7. Polyether ester imide carbamides composed of
(a) not less than 10 mol % of 4-hydroxybenzoic acid
(b) from 0.1 to 5 mol % of urea
(c$_1$) from 5 to 35 mol % of 4,4'-di(p-hydroxyphenoxy)-diphenyl sulfone
(c$_2$) a molar amount corresponding to the total amount of components (d1+d2)−(c$_1$+b) of hydroquinone and/or 4,4'-dihydroxybiphenyl
(d$_1$) from 5 to 35 mol % of 4,4'-bis[(4-carboxy)-N-phthalimido]diphenyl ether, -diphenylmethane, -diphenylsulfone, diphenylsulfide, -diphenylketone or -diphenylpropane, and
(d$_2$) from 15 to 30 mol % of terephthalic acid.

8. Polyester carbamides composed of (a) not less than 20 mol % of 4-hydroxybenzoic acid
(b) from 1 to 10 mol % of urea
($c_1$) from 5 to 15 mol % of tert.-butylhydroquinone
($c_2$) from 5 to 15 mol % of 4,4'-dihydroxybiphenyl
(d) a molar amount corresponding to the total amount of components b and c of terephthalic acid.

It will be readily understood that in the above polycondensate the components add up to 100 mol % in each case.

The liquid-crystalline state of the polycondensates can be detected with a polarization microscope by a method described in German published application DAS No. 2,520,819. Applied in a thickness of 10 μm between glass plates and viewed between crossed polarizers, the polymer melts have textures which can be ascribed to a mesomorphic phase.

Preferred polycondensates of the invention have a glass transition temperature Tg of $\geq 100°$ C., preferably $\geq 140°$ C., measured by the DSC method described in Makromol. Chem. 127 (1969), 1 ff. The preferred polycondensates form a liquid-crystalline fiber-forming melt at $\geq 400°$ C., in particular $\leq 385°$ C. Preferance is also given to liquid-crystalline polycondensates which have partial crystallinity at $>220°$ C. and $\leq 380°$ C. The temperature dependence of the shear modulus is determined in accordance with DIN 53,445.

The liquid-crystalline polycondensates according to the invention are obtainable for example in a manner similar to that described in U.S. Pat. Nos. 4,375,530 and 4,118,372. The mass condensation generally includes an alkanoylating stage in which the monomers used are reacted with acid anhydride, and a polyermization stage in which the polycondensate is formed through elimination of aliphatic carboxylic acids. Processes in which a prepolyermization stage is included are revealed in German laid-open application DOS No. 3,320,118. However, the processes described require reaction times of more than 10 hours.

In an advantageous embodiment, the polyester carbamides according to the invention are obtained in a single-stage process by converting the underivatized starting materials in the molar ratios described using anhydrides of lower fatty acids, for example fatty acids of 2 to 4 carbon atoms, in particular acetic anhydride. This conversion may be catalyzed with conventional polycondensation catalysts. In the conversion, the underivatized starting materials are heated together with the fatty acid anhydride, which is advantageously present in a molar excess of not less than 5%, based on the hydroxyl and amino groups present, with stirring in an inert gas atmosphere to a temperature at which reflux occurs. Advantageously the temperature is increased in stages, for example to 130°–170° C. in not more than 5 hours, preferably up to 2 hours. The temperature is then raised to 250°–350° C. in the course of 2–2½ hours, while excess fatty acid anhydrides and fatty acids are distilled off. To complete the reaction, it has been found to be advantageous to employ reduced pressure, for example from 0.5 to 200 mbar, toward the end of the reaction.

It is a remarkable and unforeseeable feature of this single-stage process that the desired polymers are obtained in a relatively short time in a troublefree and complete reaction even without catalysts. This is all the more astonishing as the large number of chemically different hydroxyl and amino groups and in particular the use of urea would be expected to lead to differences in reactivity and hence to inadequate polymer synthesis.

After the condensation in the melt the liquid-crystalline polycondensates thus obtained are advantageously further condensed in the solid state, for example at 150°–250° C., until the desired viscosity is obtained. This postcondensation in the solid phase can take place not only before but also after thermoplastic processing. The solid phase condensation is advantageously carried out in an inert gas atmosphere, for example nitrogen.

The polycondensation according to the invention may contain conventional additives and assistants in active amounts. Conventional additives are stabilizers against degradation by molecular oxygen, heat or UV light, for example sterically hindered phenols, hydroquinones, substituted resorcinols, salicylates, benzotriazoles or benzophenones.

Other suitable additives are dyes and pigments, for example nigrosine, titanium dioxide or phthalocyanines.

Suitable additives also include fibrous and pulverulent fillers and reinforcing agents in amounts of up to 70% by weight, such as carbon fibers, glass fibers, amorphous silica, asbestos, calcium silicate, aluminum silicate, magnesium carbonate, chalk or feldspar.

The polycondensates according to the invention are suitable for preparing filaments, films, foams and industrial moldings by injection molding, pressing or extruding. The moldings prepared from the polycondensates according to the invention have excellent mechanical properties, such as stiffness and strength. They are substantially resistant to chemicals and of low flammability. They also have a high heat distortion resistance and a smooth abrasion-resistant surface. The polycondensates according to the invention are therefore highly suitable for preparing moldings for electrical engineering, data processing, automotive construction and other industrial sectors. But they can also be used as surface coating agents in the form of pulverulent dispersions or as film.

The invention is illustrated by the following examples.

EXAMPLE 1

0.2 mole of terephthalic acid (30.3 mol %), 0.26 mole of 4-hydroxybenzoic acid (39.4 mol %), 0.16 mole of tert.-butylhydroquinone (24.2 mol %), 0.02 mole of 4,4'-dihydroxybiphenyl (3.05 mol %), 0.02 mole of urea (3.05 mol %) and 0.86 mole of acetic anhydride are weighted into a flask equipped with stirrer, nitrogen inlet and distillation attachment, and are heated in an $N_2$ atmosphere in a metal bath to 100° C. The temperature is then raised to 150° C. in 30', to 200° C. in a further 100' and finally to the final temperature of 350° C. in 120'.

The pressure is then reduced to 560 mbar and subsequently reduced by half every 10 minutes. The final vacuum is 10 mbar. In this way a highly viscous fiber-forming melt which has mesomorphic properties is obtained. DSC (differential scanning calorimetry) measurements indicate a glass transition temperature of 180° C. and a melting point of 310° C. A homogeneous mesomorphic phase exists above the melting point.

The shear modulus shows a drop of 34% from the 0° C. value at 140° C. and of 68% at 180° C. The modulus of elasticity is 18,800N/mm².

COMPARATIVE EXAMPLE 1

0.2 Mole of terephthalic acid, 0.26 mole of 4-hydroxybenzoic acid, 0.16 mole of tert.-butylhydroquinone, 0.4 mole of 4,4'-dihydroxybiphenyl and 0.86 mole of acetic anhydride are reacted as described in Example 1. The final temperature is 350° C. The final pressure is 8 mbar. DSC measurements indicate a glass transition temperature of only 164° C. A homogeneous mesomolrphic melt exists above Tg.

The shear modulus shows a drop of 41% from the 0° C. value at 140° C. and a drop of 92% at 180° C. The modulus of elasticity is 17,900N/mm².

EXAMPLE 2

0.2 mole of terephthalic acid, 0.24 mole of 4-hydroxybenzoic acid, 0.02 mole of 4-aminobenzoic acid, 0.17 mole of tert.-butylhydroquinone, 0.02 mole of 4,4'-dihydroxybiphenyl, 0.01 mole of urea and 0.86 mole of acetic anhydride are reacted as described in Example 1. DSC measurements indicate a glass transition temperature of 182° C. and a melting point of 300° C. A homogeneous mesomorphic melt exists above T$_m$ (melting point). The shear modulus shows a drop of 34% from the 0° C. value at 140° C. and a drop of 68% of 180° C.

COMPARATIVE EXAMPLE 2

0.2 mole of terephthalic acid, 0.24 mole of 4-hydroxybenzoic acid, 0.02 mole of 4-aminobenzoic acid, 0.17 mole of tert.-butylhydroquinone, 0.03 mole of 4,4'-dihydroxybiphenyl and 0.86 mole of acetic anhydride are reacted as described in Example 1. DSC measurements indicate a glass transition temperature of only 171° C. A homogeneous mesomorphic melt exists above Tg (glass transition temperature). The shear modulus shows a drop of 40% from the 0° C. value at 140° C. and a drop of 75% at 180° C.

EXAMPLE 3

0.2 mole of terephthalic acid, 0.26 mole of 4-hydroxybenzoic acid, 0.07 mole of hydroquinone, 0.06 mole of 3-aminophenol, 0.06 mole of 4,4'-dihydroxybiphenyl, 0.01 mole of urea and 0.86 mole of acetic anhydride are reacted as described in Example 1. DSC measurements indicate a glass transition temperature of 148° C. and a melting point Tm of 280° C. (peak maximum) with a wide melting range up to 320° C. The shear modulus drops to 42% at 140° C. and to 88% at 180° C. of the 0° C. value.

COMPARATIVE EXAMPLE 3

0.2 mole of terephthalic acid, 0.26 mole of 4-hydroxybenzoic acid, 0.07 mole of hydroquinone, 0.06 mole of 3-aminophenol, 0.07 mole of 4,4'-dihydroxybiphenyl and 0.86 mole of acetic anhydride are reacted as in Example 1. DSC measurements indicate a glass transition temperature of 154° C. The shear modulus drops to 59% of its 0° C. value at 140° C. and to 92% at 180° C.

EXAMPLE 4

0.1 mole of terephthalic acid, 0.1 mole of the repeat units

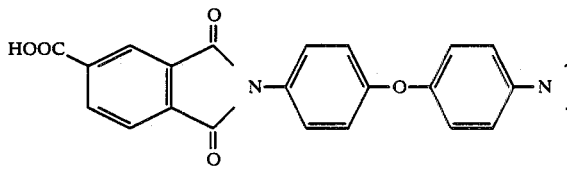

0.26 mole of 4-hydroxybenzoic acid, 0.07 mole of hydroquinone, 0.04 mole of 4,4'-dihydroxybiphenyl, 0.08 mole of 2.7-dihydroxynaphthalene, 0.01 mole of urea and 0.86 mole of acetic anhydride are reacted as described in Example 1. DSC measurements indicate a glass transition temperature of 155° C. and a melting point of 280° C.

COMPARATIVE EXAMPLE 4

In a composition as described in Example 4, the urea units (0.01 mole) are replaced by 2,7-dihydroxynaphthalene (0.01 mole). The reaction is carried out as described in Example 1. DSC measurements indicate a glass transition temperature of 156° C. A homogeneous mesomorphic melt exists above Tg.

The shear modulus drops to 50% of its 0° C. value at 140° C. and by as much as >95% at 150° C.

| Example | Tg | T$_m$ | Decrease in shear modulus 0–140° C. | Decrease in shear modulus 0–180° C. | Drop in shear modulus to 50% of 0° C. value | Modulus of elasticity |
|---|---|---|---|---|---|---|
| 1 | 180° C. | 310° C. | 34% | 68% | 170° C. | 18,800 |
| C1 | 164° C. | — | 41% | 92% | 155° C. | 17,900 |
| 2 | 182° C. | 300° C. | 34% | 68% | 165° C. | |
| C2 | 171° C. | — | 40% | 75% | 155° C. | |
| 3 | 148° C. | 280° C. | 42% | 88% | 140° C. | |
| C3 | 154° C. | — | 59% | 92% | 130° C. | |
| 4 | 155° C. | 280° C. | 35% | — | 150° C. | |
| C4 | 156° C. | — | 50% | — | 140° C. | |

We claim:

1. A liquid-crystalline carbamyl-containing polycondensate composed of
   (a) aromatic hydroxycarboxylic and/or aminocarboxylic acids in which the hydroxyl and amino groups are not vicinal to the carboxyl group,
   (b) from 0.1 to 20 mol % of urea,
   (c) aromatic dihydroxy, diamino and/or hydroxyamino compounds in which the hydroxyl and amino groups are not vicinal,
   (d) a molar amount equivalent to the total amount of components b and c of an aromatic dicarboxylic acid in which the carboxyl groups are not vicinal.

2. A liquid-crystalline carbamyl-containing polycondensate as defined in claim 1, composed of
   (a) not less than 10 mol % of one or more of the repeat units of the formula I and/or II

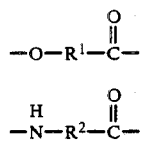

where R$^1$ and R$^2$ can be identical or different and each is 1,4-phenylene, 1,3-phenylene, 2,7-naphthylene or 2,6-naphthylene,
   (b) from 0.1 to 20 Mol % of repeat units of the formula III

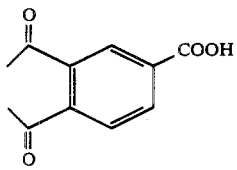

$$\begin{matrix} & \text{O} & \\ \text{H} & \| & \text{H} \\ -\text{N}-&\text{C}&-\text{N}- \end{matrix} \quad \text{III}$$

(c) one or more of the repeat units of the formula IV $$-\text{X}-\text{R}^3-\text{Y}- \quad \text{IV}$$

where $R^3$ is 1,4-phenylene, 1,3-phenylene, 2,6-naphthylene, 2,7-naphthylene, 4,4'-biphenylene, 3,4'-biphenylene, or 2,6-anthraquinoylene, which may all be substituted by halogen, alkyl of 1 to 4 carbon atoms or phenyl, or $R^3$ is ―⟨phenylene⟩―O―⟨phenylene⟩―SO₂―⟨phenylene⟩―O―⟨phenylene⟩― and X and Y can be identical or different and each is oxygen or ―NH―, (d) an amount equivalent to the total amount of components b and c of repeat units of the formula V $$\begin{matrix} \text{O} & & \text{O} \\ \| & & \| \\ -\text{C}-&\text{R}^4&-\text{C}- \end{matrix} \quad \text{V}$$

where $R^4$ is 1,4-phenylene, 1,3-phenylene or a radical of the formula VI and/or VII

[Structure VI: phthalimide-N-[phenylene-Z]ₙ-phenylene-N-phthalimide]

[Structure VII: phthalimide-N-[phenylene-Z]ₙ-meta-phenylene-N-phthalimide]

where each Z is identical or different and is ―O―, ―S―, SO₂―, ―CO―, ―CH₂― or =C(CH₃)₂, and n is 0 or 1, or $R^4$ is a radical of the formula VIII, IX or X

[Structure VIII: para-phenylene-O-C(=O)-O-para-phenylene]

[Structure IX: methyl-substituted phenylene-O-C(=O)-O-para-phenylene]

[Structure X: methyl-substituted phenylene-O-C(=O)-O-methyl-substituted phenylene]

the mol percentages of components a, b, c and d adding up to 100 mol % in each case.

3. A liquid-crystalline carbamyl-containing polycondensate as defined in claim 1, which has a glass transition temperature Tg≧140° C.

4. A liquid-crystalline carbamyl-containing polycondensate as defined in claim 1, which has partial crystallinity at >220° C. and ≦380° C.

5. A fiber from a polycondensate as defined in claim 1.

6. A film from a polycondensate as defined in claim 1.

7. A molding from a polycondensate as defined in claim 1.

* * * * *